United States Patent [19]

Valdiserri et al.

[11] 4,154,721
[45] May 15, 1979

[54] FLAME-RETARDANT PHOSPHONATE COMPOSITIONS

[75] Inventors: Leo L. Valdiserri, Belpre, Ohio; Murray S. Cohen, Convent Station, N.J.

[73] Assignee: Borg-Warner Corporation, Chicago, Ill.

[21] Appl. No.: 725,070

[22] Filed: Sep. 21, 1976

[51] Int. Cl.$^2$ .............................................. C08K 5/53
[52] U.S. Cl. ........................ 260/45.8 R; 260/45.7 R; 260/897 C
[58] Field of Search ......... 260/45.8 R, 927 R, 45.7 P, 260/45.7 RL, 897 C

[56] References Cited

U.S. PATENT DOCUMENTS

| | | | |
|---|---|---|---|
| 3,090,799 | 5/1963 | Wahl et al. | 260/927 R |
| 3,141,032 | 7/1964 | Friedman | 260/927 R |
| 3,262,999 | 7/1966 | Friedman | 260/927 R |
| 3,582,510 | 6/1971 | Cannelongo | 260/28.5 |
| 3,737,485 | 6/1973 | Hechenbleikner | 260/45.8 R |
| 3,773,715 | 11/1973 | Largman et al. | 260/45.7 P |
| 3,794,614 | 2/1974 | Versnel | 260/45.8 R |
| 3,819,770 | 6/1974 | Kraft et al. | 260/45.8 R |
| 3,864,156 | 2/1975 | Weil | 260/927 R |
| 3,875,108 | 4/1975 | Koch | 260/45.7 P |
| 3,879,345 | 4/1975 | Furukawa et al. | 260/45.7 P |
| 3,966,677 | 6/1976 | Sonoyama et al. | 260/45.7 P |
| 3,978,167 | 8/1976 | Albright | 260/45.8 R |

OTHER PUBLICATIONS

Encyclopedia of Polymer Science & Technology (vol. 7) (Interscience) (N.Y.) (1967), p. 15, TP156, P6-E6.
Murayama et al., - Chem. Abst. 78, 125779c (1973).
The Chemistry & Uses of Fire Retardants, John W. Lyons (1971) pp. 7, 8, 20 to 24, 47 to 52, 57, 58, 66, 281-297, 306 to 311, 316 to 321, 328 to 333.
Japanese Patent Publication #10644/1961, Kokura et al; and English Translation.

*Primary Examiner*—Veronica P. Hoke
*Attorney, Agent, or Firm*—Joseph Shekleton

[57] ABSTRACT

Flame-retardant polymer compositions containing a pentaerythritol diphosphonate and a halogenated organic compound having at least about 30% halogen. Dimethyl pentaerythritol disphosphonate, i.e.,

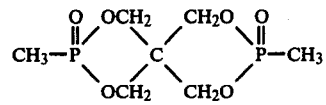

is a preferred ingredient of the composition, as is polypropylene.

16 Claims, No Drawings

FLAME-RETARDANT PHOSPHONATE COMPOSITIONS

This invention relates as indicated to flame-retardant compositions. More particularly it relates to polymer compositions which have an increased degree of flame retardance because of the presence of certain phosphonate compounds.

Polymers vary widely in their resistance to burning. Some, such as the polyolefins, polystyrene, polyalkyl acrylates and methacrylates, and the like, burn readily. Polytetrafluoroethylene, polyvinylidene chloride and polyvinyl chloride, on the other hand, have a rather high resistance to burning. It is highly desirable that, for certain applications, a polymer should have a high degree of flame retardance so that it will meet various building codes, or that it will meet safety standards imposed on the manufacture of toys, automotive applications, etc.

The treatment of those more flammable polymers to increase their resistance to burning is well known; such treatment in general has involved the incorporation in the polymer composition of substantial proportions of antimony trioxide, halogenated paraffins, halogenated hydrocarbons and low molecular weight phosphate esters. Ordinarily, though, the effective use of these and other additives has required their presence in such high concentrations as to adversely affect the desirable properties of the polymer. Thus, such desirable properties as hardness, clarity, strength, elasticity, etc., are diminished significantly by the presence of large amounts of a flame-retarding chemical.

The formulator's goal, in preparing a flame-retardant polymer composition, is to add just enough of the flame-retardant compound so as to provide the desired degree of flame retardance, but no more than this minimum amount, so as to preserve as much as possible the advantageous properties of the polymer. Frequently, it is not possible to select a flame retardant which will meet these requirements satisfactorily.

Presently used flame-retardant compositions generally include, in addition to the organic flame-retardant compound, a significant proportion, i.e., 1–15%, of an inorganic compound such as antimony trioxide ($Sb_4O_6$), antimony chloride, borax, etc. These inorganic compounds by themselves are relatively ineffective as flame retardants, but act synergistically with the organic flame-retardant compound to give much better results than can be achieved by use of the organic compound alone. By far the most widely used of these inorganic compounds is antimony trioxide; unfortunately, it is relatively expensive, so that its use in large quantities is undesirable. Against this cost factor must be balanced its superior effectiveness as a synergist.

This invention is a polymer composition comprising a normally flammable polymer, a pentaerythritol diphosphonate having the structural formula

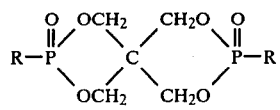

wherein R is alkyl of 1–8 carbon atoms or aryl of 6–20 carbon atoms, and a halogenated organic compound containing at least about 30% of halogen.

The pentaerythritol diphosphonate behaves as a synergist in the above combination, i.e., it alone is ineffective to impart any significant flame-retardant properties to the polymer composition, but it greatly enhances the flame-retardant properties of the halogenated organic compound. In a sense it serves as an efficient and improved complete or partial replacement for antimony trioxide which, as indicated above, is the present most commonly used flame-retardant synergist.

The alkyl groups of the dialkyl pentaerythritol diphosphonate are lower alkyl groups, i.e., of 1–8 carbon atoms. Methyl groups are preferred; ethyl, propyl, butyl, pentyl, hexyl, heptyl and octyl groups are also satisfactory. Ordinarily, the alkyl groups are alike but dialkyl pentaerythritol diphosphonates are also contemplated wherein the alkyl groups are dissimilar. Where R in the above formula is aryl, the aryl groups, which may be alike or dissimilar, may be phenyl, tolyl, xylyl, naphthyl, p-octylphenyl, 2,4-diamylphenyl, etc. Most usually it will be phenyl. The two R groups in the same molecule, when aromatic, may be the same or different.

As taught by Friedman in his U.S. Pat. No. 3,141,032, the dialkyl pentaerythritol diphosphonates can be prepared by the Arbuzov rearrangement of the corresponding phosphites, i.e., dialkyl pentaerythritol diphosphite. The Arbuzov rearrangement is carried out by heating the diphosphite in the presence of an alkyl halide catalyst or an alkali or alkaline earth metal bromide or iodide catalyst. Typical metal halide catalysts include lithium bromide, lithium iodide, sodium bromide, sodium iodide, potassium iodide, potassium bromide, magnesium iodide, magnesium bromide, calcium bromide, calcium iodide, barium bromide, barium iodide, strontium bromide and strontium iodide. When an alkyl halide is used as the catalyst it is preferred to use one in which the alkyl group is the same as that of the dialkyl pentaerythritol diphosphite.

The diaryl pentaerythritol diphosphonates may be prepared from the corresponding aryl dichlorophosphines by reaction with pentaerythritol followed by oxidation.

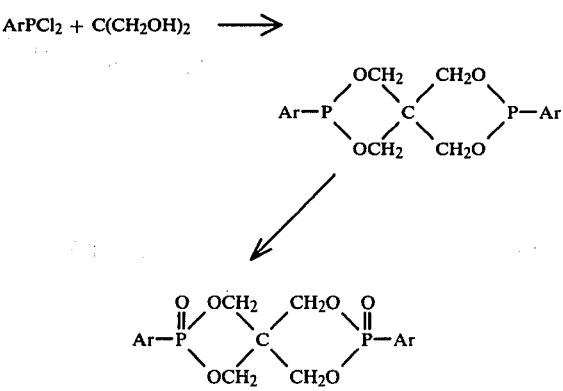

Relatively high temperatures are required inasmuch as the dialkyl pentaerythritol diphosphites are much less susceptible to rearrangement than are the simple trialkyl phosphites. Generally, temperatures within the range of from about 130° C. to about 225° C. are suitable. When the low molecular weight, relatively volatile diphosphites are used, it may be necessary to carry out the reactions in a sealed vessel, i.e., at superatmospheric pressure, so as to maintain such high temperatures.

The halogenated organic compound may, as indicated, be any such compound or mixture of such compounds which contains at least about 30% of halogen. In most cases the halogen content is at least about 45%. While the halogen may be any of the halogens, i.e., fluorine, chlorine, bromine and iodine, generally it is either chlorine or bromine. Halogenated organic compounds containing both chlorine and bromine are useful. The halogen may be either aromatic halogen, i.e., where the halogen atom is bound directly to an aromatic ring, or it may be aliphatic halogen.

Illustrative species of suitable halogenated organic compounds include brominated adducts of a polyhalocyclopentadiene and a polyunsaturated compound, as disclosed more particularly in U.S. Pat. No. 3,794,614 (Versnel); adducts of two mols of a polyhalocyclopentadiene and one mol of a polyunsaturated compound; and polyhalogenated ethers. Other suitable halogenated organic compounds include polymeric materials like poly(vinylchloride), poly(vinylidene chloride), copolymers of vinyl chloride and vinylidene chloride, etc. Additional illustrative species are disclosed in U.S. Pat. Nos. 3,922,316 (Versnel); 3,915,932 (Wolford et al.); 3,915,930 (Dotson et al.); 3,899,463 (Newcombe); 3,894,988 (Anderson et al.); 3,894,987 (Anderson); 3,892,710 (Anderson et al.); 3,891,599 (Marciniak et al.); 3,878,165 (Anderson); 3,876,612 (Anderson et al.); 3,830,779 (Anderson); 3,810,867 (Anderson); 3,810,666 (Anderson); 3,786,023 (Dotson et al.); 3,761,443 (Newcombe); 3,714,274 (Rosenberg); 3,687,983 (Dever et al.); 3,392,136 (Hindersinn et al.); U.K. Pat. No. 1,090,814; German Pat. No. 2,328,535; German Pat. No. 2,328,520; German Pat. No. 2,328,517; and Canadian Pat No. 919,856.

The normally flammable polymers include polystyrene, polyethylene terephthalate, polybutylene terephthalate, polyolefins such as polyethylene, polypropylene, polyisobutylene, EPDM polymers, polyisoprene and the like, ABS polymers, MBS polymers, poly(alkylacrylate) and poly(methyl methacrylates) and poly(vinylacetate). Also included are highly plasticized polymers of vinyl chloride and vinylidene chloride.

Any polymer with which the halogenated organic compound and pentaerythritol diphosphonate of this invention can be mixed to form a substantially homogeneous mass may be made resistant to fire by the addition of these additives. Combinations of two or more polymers may be rendered flame retardant by the invention herein.

The above flame-retardant compounds may suitably be added to any normally flammable polymer in amounts sufficient to give the desired degree of flame retardation. The amount required to give a desirable flame-retardant polymer varies widely depending upon the particular polymer, the shape of the polymer in its final form and the degree of flame retardation desired. The compositions herein contain a flame-retarding amount of the combination of additives. By "flame-retarding amount" is meant that amount which when present in the polymer measurably reduces the tendency of the polymer to burn. They may contain up to about 50% of such combination of additives. In the preferred compositions the combined additives will comprise from about 1 to about 30% of the composition. In most instances, because of the relative cost and effectiveness, the compositions will contain from about 5 to about 25% of the combined additives.

The ratio of dialkyl pentaerythritol diphosphonate to halogenated organic compound will vary, depending primarily upon the particular halogenated organic compound which is used in the combination, as well as on the type of polymer. The ratio may range from about 1:5 to about 15:1.

Preparation of the flame-retardant compositions of this invention is best accomplished by mixing them in an electrically heated Brabender head for about 10 minutes at 200° C. and 60 rpm. The test specimens for which data is shown in the tables are prepared from compression molded slabs.

The compositions for which test data is set out in the tables each contain, in addition to the polymer, dialkyl pentaerythritol diphosphonate and halogenated organic compound, 0.50 part of calcium stearate (lubricant), 0.15 part of distearyl pentaerythritol diphosphite (heat stabilizer . . . at this low concentration it has no significant effect on the flame-retardant properties of the composition) and 0.10 part of Irganox 1010 (antioxidant).

The flame retardance of a plastic material can be determined by means of Underwriters Laboratories Test UL-94. The test specimen measures $5''\times0.5''\times0.125''$; it is suspended vertically at a measured height above the flame from a Bunsen burner. After 10 seconds the flame is removed and the duration of the flaming of the test specimen is noted. Immediately, the flame is placed again under the specimen and after 10 seconds the flame again is withdrawn and the duration of flaming and glowing is noted. Five test specimens are thus tested and the results of all five tests are considered in the determination of a rating for the plastic material.

The following are noted: (1) duration of flaming after first flame application; (2) duration of flaming after second flame application; (3) duration of flaming plus glowing after second flame application; (4) whether or not specimens burn up to their point of suspension; and (5) whether or not specimens drip flaming particles which ignite a cotton swatch placed 12 inches beneath the test specimen. The highest rating given to a material is "V-0". It indicates that (1) no specimen burns with flaming combustion for more than 10 seconds after each application of the test flame; (2) the material does not have a flaming combustion time exceeding 50 seconds for the 10 flame applications for each set of 5 specimens; (3) no specimen burns with flaming or glowing combustion up to the holding clamp; (4) no specimen drips flaming particles that ignite the dry cotton beneath the specimen; and (5) no specimen glows for more than 30 seconds after the second removal of the flame.

The next highest rating is "V-1". It indicates that (1) no specimen burns with flaming combustion for more than 30 seconds after each application of the test flame; (2) the material does not have a flaming combustion time exceeding 250 seconds for the 10 flame applications for each set of 5 specimens; (3) no specimen burns with flaming or glowing combustion up to the holding clamp; (4) no specimen drips flaming particles that ignite the dry surgical cotton beneath the specimen; and (5) no specimen glows for more than 60 seconds after the second removal of the flame.

A "V-2" rating is given to a composition (1) when no specimen burns with flaming combustion for more than 30 seconds after each application of the test flame; (2) it does not have a total flaming combustion time exceeding 250 seconds for the 10 flame applications for each set of 5 specimens; (3) no specimen burns with flaming or glowing combustion up to the holding clamp; (4) some specimens drip flaming particles which burn only briefly, some of which ignite the dry cotton beneath the specimen; and (5) no specimen glows for more than 60 seconds after the second removal of the flame.

The lowest rating given to a material in this test is "NSE" ("non-self-extinguishing"). It indicates that the material has failed to meet one or more of the criteria for the UL-94 vertical test.

Another test for the flammability of a plastic material measures the minimum concentration of oxygen that will just support combustion. The test is an ASTM test, D 2863-70. It is carried out in a glass column wherein the concentration of oxygen is varied until that concentration is found which will just support the burning of a test specimen, for 3 minutes or until 50 mm of the specimen has burned. The test specimen is 70–150 mm long by 6.5 mm wide by 3.0 mm thick. This concentration of oxygen is called the oxygen index. A high oxygen index indicates a highly flame-retardant specimen.

The effectiveness of the compositions herein in resisting flaming is shown by the data in Table I, where such effectiveness is shown (in polypropylene) as a function of the ratio of dimethyl pentaerythritol diphosphonate (DPD) to Dechlorane, a halogenated organic compound ($HOC_1$) prepared by the reaction of two mols of hexachlorocyclopentadiene and one mol of cyclooctadiene-1,5 and containing 65% chlorine.

Table I

| | Polypropylene | DPD | $HOC_1$ | DPD/$HOC_1$ | ABT* |
|---|---|---|---|---|---|
| 1. | 90.0 | 5.00 | 5.00 | 1:1 | 10.2 |
| 2. | 90.0 | 6.00 | 4.00 | 1.5:1 | 13.2 |
| 3. | 90.0 | 7.00 | 3.00 | 2.3:1 | 12.8 |
| 4. | 90.0 | 8.00 | 2.00 | 4:1 | 14.0 |
| 5. | 90.0 | 8.40 | 1.60 | 5:1 | 18.3 |
| 6. | 90.0 | 8.75 | 1.25 | 7:1 | 15.0 |
| 7. | 90.0 | 9.00 | 1.00 | 9:1 | 9.5 |
| 8. | 90.0 | 9.17 | 0.83 | 11:1 | 18.5 |
| 9. | 90.0 | 9.29 | 0.71 | 13:1 | 24.5 |
| 10. | 90.0 | — | 10.00 | — | >30 |
| 11. | 90.0 | 10.00 | — | — | >30 |

*ABT = average burning time

Although each of the above, except Nos. 10 and 11, exhibits an average burning time of less than 25 seconds and would thus qualify for a rating of V-1, each test specimen also dripped flaming particles which ignited dry cotton beneath the specimen; this requires assignment of a V-2 rating to all of the above.

In Table II similar data is presented, except that the halogenated organic compound is 1,2-bis(2,4,6-tribromophenoxy)ethane ($HOC_2$). Its halogen content is approximately 70%.

Table II

| | Polypropylene | DPD | $HOC_2$ | DPD/$HOC_2$ | ABT |
|---|---|---|---|---|---|
| 1. | 90.0 | 5.0 | 5.0 | 1:1 | >30 |
| 2. | 90.0 | 6.0 | 4.0 | 1.5:1 | 10.4 |
| 3. | 90.0 | 7.0 | 3.0 | 2.3:1 | 10.2 |
| 4. | 90.0 | 8.0 | 2.0 | 4:1 | 5.4 |
| 5. | 90.0 | 9.0 | 1.0 | 9:1 | 4.2 |
| 6. | 90.0 | 9.17 | 0.83 | 11:1 | 13.2 |
| 7. | 90.0 | 9.29 | 0.71 | 13:0 | NSE* |

*NSE = non-self-extinguishing

Additional data of the same type is presented in Table III; in this case, the halogenated organic compound is a dibrominated 1:1 Diels-Alder adduct of hexachlorocyclopentadiene and cyclooctadiene-1,5 ($HOC_3$), i.e.,

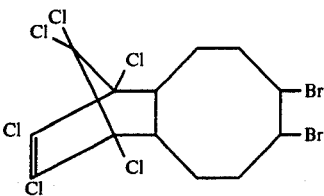

It contains approximately 29% bromine and approximately 40% chlorine.

Table III

| | Polypropylene | DPD | $HOC_3$ | DPD/$HOC_3$ | ABT |
|---|---|---|---|---|---|
| 1. | 90.0 | 5.0 | 5.0 | 1:1 | 3.0 |
| 2. | 90.0 | 6.0 | 4.0 | 1.5:1 | 1.6 |
| 3. | 90.0 | 6.7 | 3.3 | 2:0 | 0.8 |
| 4. | 90.0 | 7.0 | 3.0 | 2.3:1 | 0.8 |
| 5. | 90.0 | 8.0 | 2.0 | 4:1 | 1.8 |
| 6. | 90.0 | 9.0 | 1.0 | 9:1 | 5.0 |

Table IV shows the similar performance of various combinations of dimethyl pentaerythritol diphosphonate and decabromobiphenylene oxide ($HOC_4$), i.e.,

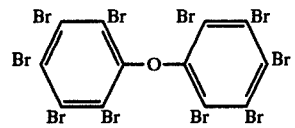

The ratios of these two additives are varied from 2:1 to 9:1.

Table IV

| | Polypropylene | DPD | $HOC_4$ | DPD/$HOC_4$ | ABT |
|---|---|---|---|---|---|
| 1. | 90.0 | 6.67 | 3.33 | 2:1 | 17.6 |
| 2. | 90.0 | 7.50 | 2.50 | 3:1 | 17.8 |
| 3. | 90.0 | 8.40 | 1.60 | 5.25:1 | 23.2 |
| 4. | 90.0 | 8.75 | 1.25 | 7:1 | 27.0 |
| 5. | 90.0 | 9.00 | 1.00 | 9:1 | 22.8 |

Nos. 1 and 2 have an oxygen index of 23.5; Nos. 3, 4 and 5 have an oxygen index of 23.0.

Data showing the effectiveness of the combined additives as their total amount is varied is presented in Table V. In this case the halogenated organic compound is that shown in Table I, i.e., the reaction product of two mols of hexachlorocyclopentadiene and one mol of cyclooctadiene1,5($HOC_1$). The ratio of these two additives, in these tests, is that optimum ratio shown also in Table I, viz., 9:1.

Table V

| | Polypropylene | DPD | $HOC_1$ | ABT |
|---|---|---|---|---|
| 1. | 92.5 | 6.75 | 0.75 | NSE |
| 2. | 90.0 | 9.00 | 1.00 | 12.4 |
| 3. | 87.5 | 11.25 | 1.25 | 4.2 |
| 4. | 85.0 | 13.50 | 1.50 | 4.0 |
| 5. | 80.0 | 18.00 | 2.00 | 2.8 |

All specimens in Table V, except No. 5, dropped flaming particles which ignited dry cotton beneath the specimen. Specimen No. 5 dropped flaming particles but they did not always ignite the dry cotton.

In Table VI similar data is presented showing the performance of the 1,2-bis(2,4,6-tribromophenoxy)ethane ($HOC_2$) of Table II, as the total amount of $HOC_2$ and DPD is increased, at a 9:1 ratio.

Table VI

| | Polypropylene | DPD | HOC₂ | ABT |
|---|---|---|---|---|
| 1. | 92.5 | 6.75 | 0.75 | >30 |
| 2. | 90.0 | 9.00 | 1.00 | >30 |
| 3. | 87.5 | 11.25 | 1.25 | 5.6 |
| 4. | 85.0 | 13.50 | 1.50 | 4.2 |
| 5. | 80.0 | 18.00 | 2.00 | 2.6 |
| 6. | 75.0 | 22.50 | 2.50 | 3.0 |

Similar data is shown in Table VII, where the halogenated organic compound is that shown in Table III, i.e., the dibrominated 1:1 Diels-Alder adduct of hexachlorocyclopentadiene and cyclooctadiene-1,5. The ratio of these additives in each test for which data is shown is 2:1.

Table VII

| | Polypropylene | DPD | HOC₃ | ABT |
|---|---|---|---|---|
| 1. | 95.0 | 3.33 | 1.67 | 7.8 |
| 2. | 92.5 | 5.00 | 2.50 | 6.4 |
| 3. | 90.0 | 6.67 | 3.33 | 2.2 |
| 4. | 87.5 | 8.33 | 4.17 | 2.0 |
| 5. | 85.0 | 10.00 | 5.00 | 1.0 |
| 6. | 80.0 | 13.33 | 6.67 | 0.2 |

Specimens 1–5 each dripped flaming particles which ignited the dry cotton beneath, which causes these specimens to be rated V-2. Specimen No. 6, on the other hand, did not drip flaming particles and, since its maximum burning time is less than 10 seconds, it is rated V-0.

The flame-retardant effect of the combination herein on polystyrene is shown by the test data in Table VIII. The halogenated organic compound is the dibrominated 1:1 Diels-Alder adduct of hexachlorocyclopentadiene and cyclooctadiene-1,5 (HOC₃). The ABT data is shown for several ratios of HOC₃:DPD.

Table VIII

| | Polystyrene* | DPD | HOC₃ | DPD/HOC₃ | ABT | O.I |
|---|---|---|---|---|---|---|
| 1. | 80.0 | 13.4 | 6.6 | 2:1 | 13.4 | 23.5 |
| 2. | 80.0 | 16.0 | 4.0 | 4:1 | 20.0 | 23.0 |
| 3. | 80.0 | 17.8 | 2.2 | 8:1 | >30 | 23.5 |

*"Impact polystyrene," i.e., prepared by polymerization of styrene in the presence of a small proportion of a copolymer of styrene and butadiene, such that the product contains 10% of butadiene units.

The flame-retardant effect of the combination herein on ABS resins is shown by the data in Table IX. The particular ABS resin tested is a graft polymer of 51.5% of styrene and 28.5% of acrylonitrile on 20% of polybutadiene. The halogenated organic compound is the 1,2-bis(2,4,6-tribromophenoxy)ethane (HOC₂) of Table II.

Table IX

| | ABS | DPD | HOC₂ | DPD/HOC₂ | ABT | O.I |
|---|---|---|---|---|---|---|
| 1.* | 68.3 | 7.5 | 19.8 | 1:2.6 | 1.0 | 26.5 |
| 2.* | 75 | 6.25 | 18.75 | 1:3 | 2.3 | 25.0 |
| 3.** | 68.3 | 10.2 | 16.4 | 1:1.6 | 0.7 | 26.0 |

*Also contains 5 parts of chlorinated polyethylene (36% Cl), 0.75 part of magnesium stearate, 0.5 part of dibutyl tin dimaleate and 1.2 parts of polyethylene glycol.
**Also contains 3.4 parts of chlorinated polyethylene (36% chlorine), 0.75 part of magnesium stearate, 0.34 part of polyethylene glycol and 1.85 part of dibutyl tin dimaleate.

Each of the above tested ABS formulations (in Table IX) is rated V-0. It will be noted that the total amount of the combined additives in these formulations is 27.3%, 25.0% and 26.8%, respectively.

All parts and percentages herein are by weight unless otherwise clearly expressed.

We claim:

1. A composition comprising from about 1 to about 50% of a combination of (A) a pentaerythritol diphosphonate having the structural formula

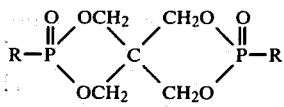

wherein R is alkyl of 1–8 carbons or aryl of 6–20 carbon atoms, and (B) a halogenated organic compound containing at least about 30% of halogen, the ratio of (A) to (B) being from about 1:5 to about 15:1; and a normally flammable polymer with which (A) and (B) can be mixed to form a homogeneous mass.

2. The composition of claim 1 wherein R is methyl.

3. The composition of claim 1 wherein the halogenated organic compound is a halogenated aliphatic compound.

4. The composition of claim 1 wherein the flammable polymer is a polyolefin.

5. The composition of claim 1 wherein the flammable polymer is polypropylene.

6. The composition of claim 1 wherein the halogenated organic compound contains at least about 50% of halogen.

7. The composition of claim 1 wherein the total amount of pentaerythritol diphosphite and halogenated organic compound is from about 1 to about 30% of the composition.

8. A composition comprising from about 1 to about 50% of a combination of (A) a dialkyl pentaerythritol diphosphonate wherein the alkyl groups contain 1–8 carbon atoms, and (B) a halogenated organic compound containing at least about 30% of halogen, the ratio of (A) to (B) being from about 1:5 to about 15:1, and a normally flammable polymer with which (A) and (B) can be mixed to form a homogeneous mass.

9. The composition of claim 8 wherein the alkyl groups of (A) are methyl.

10. The composition of claim 8 wherein the halogenated organic compound of (B) contains at least about 50% of halogen.

11. The composition of claim 4 wherein the halogenated organic compound of (B) contains at least about 50% of halogen.

12. The composition of claim 11 wherein the halogen of the halogenated organic compound is chlorine, bromine or a mixture thereof.

13. The composition of claim 4 wherein the halogenated organic compound of (B) contains at least about 50% of halogen.

14. The composition of claim 13 wherein the halogen of the halogenated organic compound is chlorine, bromine or a mixture thereof.

15. A composition comprising from about 1 to about 50% of a combination of (A) a dimethyl pentaerythritol diphosphonate, and (B) a halogenated organic compound containing at least about 50% of halogen wherein the halogen is chlorine, bromine or a mixture thereof, the ratio of (A) to (B) being from about 1:5 to about 15:1, and a normally flammable polymer with which (A) and (B) can be mixed to form a homogeneous mass.

16. The composition of claim 15 wherein the halogenated organic compound of (B) has the structure:

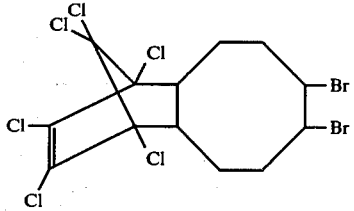

* * * * *

Dedication

4,154,721.—*Leo L. Valdiserri*, Belpre, Ohio, and *Murray S. Cohen*, Convent Station, N.J. FLAME-RETARDANT PHOSPHONATE COMPOSITION. Patent dated May 15, 1979. Dedication filed June 24, 1980, by the assignee, *Borg-Warner Corporation*.

Hereby dedicates to the Public claims 1 and 6 of said patent.

[*Official Gazette September 9, 1980.*]